(12) United States Patent
Lai

(10) Patent No.: US 9,680,828 B2
(45) Date of Patent: Jun. 13, 2017

(54) MOBILE DEVICES, TERMINAL DEVICES, AND AUTHENTICATION METHODS THEREOF

(71) Applicant: MediaTek Inc., Hsin-Chu (TW)

(72) Inventor: Chao-Jung Lai, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 14/561,649

(22) Filed: Dec. 5, 2014

(65) Prior Publication Data

US 2015/0172290 A1 Jun. 18, 2015

Related U.S. Application Data

(60) Provisional application No. 61/916,896, filed on Dec. 17, 2013.

(30) Foreign Application Priority Data

Nov. 25, 2014 (CN) .......................... 2014 1 0683525

(51) Int. Cl.
| | | |
|---|---|---|
| *H04L 29/06* | (2006.01) | |
| *H04L 9/32* | (2006.01) | |
| *G06F 21/44* | (2013.01) | |
| *G06F 3/041* | (2006.01) | |
| *G06F 3/046* | (2006.01) | |
| *G06F 9/44* | (2006.01) | |

(52) U.S. Cl.
CPC .......... *H04L 63/0876* (2013.01); *G06F 3/046* (2013.01); *G06F 3/0416* (2013.01); *G06F 9/4443* (2013.01); *G06F 21/44* (2013.01); *H04L 9/321* (2013.01); *H04L 63/0884* (2013.01)

(58) Field of Classification Search
CPC .................................................. H04L 63/0876
USPC ......................................................... 713/155
See application file for complete search history.

(56) References Cited

U.S. PATENT DOCUMENTS

| | | | | |
|---|---|---|---|---|
| 5,812,668 A | * | 9/1998 | Weber .................... | G06Q 20/02 705/16 |
| 8,131,281 B1 | * | 3/2012 | Hildner ............... | H04L 41/0806 455/418 |
| 2002/0122064 A1 | | 9/2002 | Yamakado | |
| 2005/0216735 A1 | * | 9/2005 | Huang .................. | H04L 9/0891 713/165 |

(Continued)

FOREIGN PATENT DOCUMENTS

| | | |
|---|---|---|
| CN | 102916729 | 2/2013 |
| EP | 2 063 346 | 5/2009 |
| WO | WO 2012/148796 | 11/2012 |

*Primary Examiner* — Peter Shaw
(74) *Attorney, Agent, or Firm* — McClure, Qualey & Rodack, LLP (57) ABSTRACT

A mobile device including a touch panel and a processing unit is provided. The touch panel includes one transmitting electrode and one receiving electrode. The transmitting electrode performs signal transmission using a touch-link technology, and the receiving electrode performs signal reception using the touch-link technology. The processing unit receives a message from a terminal device via the receiving electrode, and transmits an identification number to the terminal device via the transmitting electrode according to the message, so as to use the identification number for a verification on the terminal device.

7 Claims, 6 Drawing Sheets

(56) References Cited

U.S. PATENT DOCUMENTS

| | | | |
|---|---|---|---|
| 2006/0183462 A1* | 8/2006 | Kolehmainen | H04B 5/00 |
| | | | 455/411 |
| 2011/0304583 A1 | 12/2011 | Kruglick | |
| 2012/0265996 A1* | 10/2012 | Kaal | H04L 63/102 |
| | | | 713/182 |
| 2013/0147760 A1* | 6/2013 | Lai | H04B 5/0012 |
| | | | 345/174 |
| 2014/0199944 A1 | 7/2014 | Ran et al. | |
| 2015/0012968 A1* | 1/2015 | Sugahara | G06F 21/445 |
| | | | 726/2 |

\* cited by examiner

MOBILE DEVICES, TERMINAL DEVICES, AND AUTHENTICATION METHODS THEREOF

CROSS REFERENCE TO RELATED APPLICATIONS

This Application claims priority of U.S. Provisional Application No. 61/916,896, filed on Dec. 17, 2013, the entirety of which is incorporated by reference herein. This Application also claims priority of China Patent Application No. 201410683525.X, filed on Nov. 25, 2014, the entirety of which is incorporated by reference herein.

BACKGROUND OF THE INVENTION

Field of the Invention

The invention generally relates to security control techniques, and more particularly, to security control by transmitting the identification number of a mobile device to a terminal device through touch-link technology for verification on the terminal device.

Description of the Related Art

Near Field Communication (NFC) is a particular wireless identification and communication technology which enables electronic devices, such as mobile devices, consumer electronics, personal computers (PCs), and smart devices, to wirelessly communicate with each other in close distance through magnetic field communication, so that users of the electronic devices may intuitively exchange information, contents of interviews, and services therewith.

Due to growing market demand for handheld devices (e.g., mobile phones) with the NFC feature, mobile payment is widely available, including paying with NFC devices that serve as electronic wallets, and collecting with NFC devices that serve as Point of Sale (POS) units. However, the NFC feature inevitably increases the size of an NFC device since an extra component, such as a card sensor or the like, is required for signal transmission and reception through magnetic field communication. In addition, the extra component also imposes physical limitations on the structure and component material of the NFC device.

Along with the development of touch-sense technology, touch-controlled panel devices have become more and more popular. In an application of touch-sense technology, a touch-controlled panel device can detect and respond to physical contact by a user. Besides touch-sense technology, "touch-link technology" for touch-controlled panel devices has recently been developed, such as that recited in patent applications US 2011/0304583, US 2013/0147760, and CN 102916729A, which implements near field wireless communication by trying to utilize the existing touch-controlled panel and the corresponding hardware devices. Generally, a touch-controlled panel device includes a touch panel, a signal processing circuit and a central processing unit (CPU). For example, the touch-controlled panel device may be a touch pad without a display function or a touch screen with a display function. The touch-controlled panel device may include a touch sensor. The touch sensor includes a plurality of driving electrodes and a plurality of sensing electrodes on a substrate. The touch-controlled panel device is usually implemented with Indium Tin Oxide (ITO) materials. The signal processing circuit is usually implemented by an Integrated Circuit (IC). The signal-processing circuit provides two main functions. One is performing analog-to-digital conversion, demodulation, or other signal-processing procedures on the analog signals received from the touch panel, and then transmitting the processed signals to the CPU. Another is receiving digital signals from the CPU, performing modulation, digital-to-analog conversion, or other signal-processing procedures on the received digital signals and then transmitting the processed signals to the touch panel. In an application of touch-sense technology, when user touches the touch-controlled panel device with his finger or a stylus, corresponding analog signals are generated by the touch on the driving electrodes and sensing electrodes via the touch sensor. The signals are transmitted to the CPU after being processed by the signal processing circuit. The CPU calculates the position where the user has touched via proper algorithm(s) and responses to the contact of the user. In the application of touch-link technology, the driving electrode and/or the sensing electrode can act as a transmitting electrode for transmitting signals, and the driving electrode and/or the sensing electrode can act as a receiving electrode for receiving signals. When transmitting signals, a touch-controlled panel device can modulate and process the signal to be transmitted by the signal processing circuit, and transmit the processed signals to another touch-controlled panel device via the transmitting electrode by electric field coupling. The receiving electrode of the other touch-controlled panel device receives the transmitted signal. When receiving signals, a touch-controlled panel device can receive a signal via the receiving electrode by electric field coupling, demodulate the signals by the signal processing circuit, and then transmit the processed signal to the processer for further processing. Therefore, the signals can be transmitted and received by using the original electrodes to realize touch transmission based on electric fields without an inductive card reader or components with a similar function being incorporated. Compared to the conventional NFC technology, touch-link technology reduces both volume and cost. This is because some of the existing hardware may be reused. For system developers, the additional effort may be some software and/or firmware revision and porting so as to enable the existing hardware to support touch-link technology. For example, a protocol may be needed when using touch-link technology to transmit and/or receive data; the software may be modified to implement the protocol. Of course, touch-link technology also works when not using the existing hardware such as the existing touch-controlled panel device, but when using another touch-controlled panel and the signal processing circuit to realize touch-link technology. In addition, in an application of the touch sense technology, there are two common types of touch-controlled panel devices, including the capacitive type and resistive type. For the applications of touch-link technology, besides the capacitive type of touch-controlled panel devices, the resistive type of touch-controlled panel devices can also be used to realize the touch-link technology.

On the other hand, with rapid development of ubiquitous computing and networking, daily errands, such as distance education, electronic commerce, social networking, online gaming, and household registration, may be easily accomplished via online transactions. Despite the convenience, a user is inevitably required to register a respective account and password for each service website or device as the key to gaining access thereto. Unfortunately, the user may be forced to set up multiple accounts and passwords for different service websites or devices due to each service website or device having its own rules for defining an account and password, or the habitual account and/or password of the user already being taken in some service websites or devices. Thus, as the number of accounts and passwords increases, the management of multiple accounts and passwords has become a heavy burden for users.

For security controls over electronic devices, one of the most common solutions is for users to memorize their own accounts and passwords, which is highly unreliable and inefficient. Alternatively, there are other authentication methods which do not require any account and password, such as fingerprint identification, speech recognition, and face identification. For security controls over service websites, one of the most common solutions is to allow a browser to automatically save the inputted accounts and passwords. However, the security level provided by this solution is low, since anyone who has access to the electronic device can use the account and password through the browser. Not to mention that, the solution lacks portability due to the account and password being saved only in the electronic device. Thus, it is desirable to have a more flexible and efficient method of security control which not only blocks unauthorized access but also eliminates the burden on users of managing accounts and passwords.

BRIEF SUMMARY OF THE INVENTION

To an increasing extent, various mobile devices, such as smartphones, panel Personal Computers (PCs), multimedia players, and handheld gaming consoles, have been developed to meet the needs of mobile computing and entertainment. In particular, most mobile devices are equipped with touch panels for providing more intuitive and convenient user interfaces. As touch-based user interfaces grow in popularity, even terminal devices, such as desktop PCs, notebook PCs, automated teller machines (ATMs), and information kiosks, are mounted with touch panels. In order to solve the aforementioned problems, the invention proposes signature verification methods for communicating signature information between two touch-sensitive devices using their respective touch panels as the communication mediums.

In a first aspect of the invention, a mobile device is provided. The mobile device comprises a touch panel and a processing unit. The touch panel comprises at least one transmitting electrode and at least one receiving electrode, wherein the transmitting electrode performs signal transmission using a touch-link technology, and the receiving electrode performs signal reception using the touch-link technology. The processing unit is configured to receive a message from a terminal device via the receiving electrode, and transmit an identification number to the terminal device via the transmitting electrode according to the message, so as to use the identification number for a verification on the terminal device.

In a second aspect of the invention, a terminal device is provided. The terminal device comprises a touch panel and a processing unit. The touch panel comprises at least one transmitting electrode and at least one receiving electrode, wherein the transmitting electrode performs signal transmission using a touch-link technology, and the receiving electrode performs signal reception using the touch-link technology. The processing unit is configured to transmit a message to a mobile device via the transmitting electrode, receive a first identification number from the mobile device via the receiving electrode, and use the first identification number for a verification on the terminal device.

In a third aspect of the invention, a verification method in use between a mobile device and a terminal device close to or in contact with each other is provided. Each of the mobile device and the terminal device is equipped with a respective touch panel comprising at least one transmitting electrode and at least one receiving electrode, wherein the mobile device performs signal transmission and reception using a touch-link technology via the transmitting electrode and the receiving electrode, respectively, and the terminal device performs signal transmission and reception using the touch-link technology via the transmitting electrode and the receiving electrode, respectively. The verification method comprises the steps of: transmitting a message from the terminal device to the mobile device; transmitting a first identification number from the mobile device to the terminal device according to the message; and performing a verification on the terminal device according to the first identification number.

In a fourth aspect of the invention, a mobile device is provided. The mobile device comprises a touch panel and a processing unit. The touch panel comprises at least one transmitting electrode and at least one receiving electrode, wherein the transmitting electrode performs signal transmission using a touch-link technology, and the receiving electrode performs signal reception using the touch-link technology. The processing unit is configured to receive encrypted data of a server from a terminal device via the receiving electrode, launch an application program associated with the server to decrypt the encrypted data according to the identification number and generate decrypted data, and transmit the decrypted data to the terminal device via the transmitting electrode, thereby enabling the terminal device to transmit the decrypted data to the server to assist the mobile device with obtaining a log-in access or transaction authorization of the server.

In a fifth aspect of the invention, a terminal device is provided. The terminal device comprises a communication unit, a touch panel, and a processing unit. The communication unit is configured to provide a connection to a server via the Internet. The touch panel comprises at least one transmitting electrode and at least one receiving electrode, wherein the transmitting electrode performs signal transmission using a touch-link technology, and the receiving electrode performs signal reception using the touch-link technology. The processing unit is configured to receive encrypted data from the server via the communication unit, transmit the encrypted data to a mobile device via the transmitting electrode, receive decrypted data from the mobile device via the receiving electrode, transmit the decrypted data to the server via the communication unit, so as to obtain a log-in access or transaction authorization of the server.

In a sixth aspect of the invention, a verification method in use between a mobile device and a terminal device close to or in contact with each other is provided. Each of the mobile device and the terminal device is equipped with a respective touch panel comprising at least one transmitting electrode and at least one receiving electrode, wherein the mobile device performs signal transmission and reception using a touch-link technology via the transmitting electrode and the receiving electrode, respectively, and the terminal device performs signal transmission and reception using the touch-link technology via the transmitting electrode and the receiving electrode, respectively. The verification method comprises the steps of: transmitting encrypted data of a server from the terminal device to the mobile device through the touch-link technology; launching an application program associated with the server in the mobile device to decrypt the encrypted data according to an identification number of the mobile device and generate decrypted data; transmitting the decrypted data from the mobile device to the terminal device through the touch-link technology; and transmitting the decrypted data from the terminal device to the server via the Internet, so as to assist the mobile device with obtaining a log-in access or transaction authorization of the server.

Other aspects and features of the present invention will become apparent to those with ordinary skill in the art upon review of the following descriptions of specific embodiments of the mobile devices, terminal devices, and verification methods thereof.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
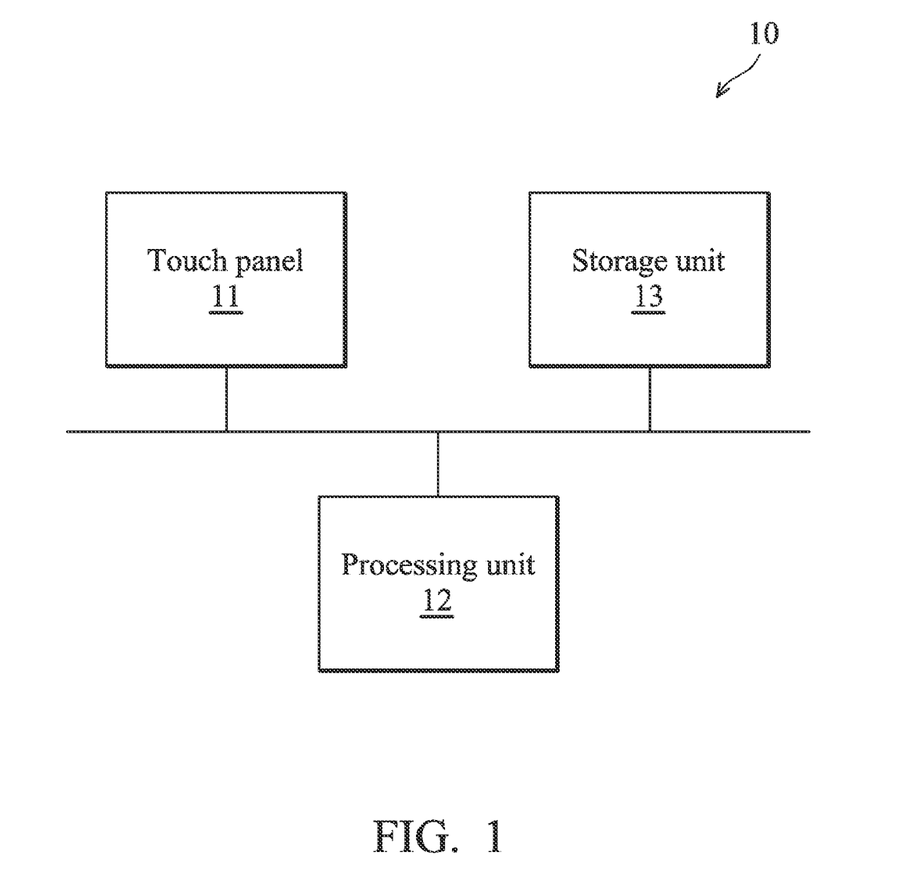
FIG. 1 is a block diagram illustrating a mobile device supporting touch-link technology according to an embodiment of the invention.

FIG. 1 is a block diagram illustrating a mobile device supporting touch-link technology according to an embodiment of the invention. The mobile device 10 comprises a touch panel 11, a processing unit 12, and a storage unit 13. The mobile device 10 may be a mobile phone, smartphone, wearable device (e.g., glasses, or watch), panel PC, Portable Media Player (PMP), or portable gaming device.

The touch panel 11 may include a display device, such as a Liquid-Crystal Display (LCD), a Light-Emitting Diode (LED), or an Electronic Paper Display (EPD), for providing the display function. The touch panel 11 may further include one or more transmitting electrodes and receiving electrodes (which may be referred to as driving electrodes and sensing electrodes, respectively) disposed on or under the display device, for providing a touch-based Man-Machine Interface (MMI) by detecting touches or proximities of conductive objects (e.g., a finger or touch pen) according to changes of the signals transmitted and received by the transmitting electrodes and receiving electrodes, respectively. In addition, with the transmitting electrodes and the receiving electrodes, the mobile device 10 can exchange information with another touch-controlled panel device through the touch-link technology. The detailed description of the touch-link technology has already been provided above, and is not repeated here for brevity. In the following description, the signal transmission of the transmitting electrode and the signal reception of the receiving electrode are both performed using the touch-link technology.

The processing unit 12 may include a processor and a signal processing circuit. The processor may be a Central Processing Unit (CPU), Micro-Control Unit (MCU), Digital Signal Processor (DSP), or the like, which provides the function of data processing and computing. The signal processing circuit may include an Analog-to-Digital Conversion (ADC) circuit, a demodulation circuit, a Digital-to-Analog Conversion (DAC) circuit, and a modulation circuit. The first function of the signal processing circuit is to perform ADC and demodulation on the analog signals received from the touch panel 11, and then send the digital signals to the processor. The second function of the signal processing circuit is to perform modulation and DAC on the digital signals received from the processor, and then send the analog signals to the touch panel 11. For implementation, the processor and the signal processing circuit may be incorporated into a single Integrated Circuit (IC), or they may be realized with two separate ICs. The processing unit 12 may load and execute a series of instructions and/or program codes from the storage unit 13 to control the operation of the touch panel 11 and obtain the identification number of the mobile device 10, for performing the verification method of the invention. The identification number may be a Product Identification Number (PIN) which may be used to uniquely identify the mobile device 10. For example, if the mobile device 10 is a mobile phone, smartphone, or panel PC, the identification number may be an International Mobile Equipment Identity number (IMEI). Alternatively, the identification number may be a user code, such as e-mail account, phone number, or Personal Identification Number (PIN).

The storage unit 13 may be a non-volatile memory (e.g., a Read-Only Memory (ROM), Flash memory, hard disc, optical disc, etc.), or it may be a volatile memory (e.g., a Random Access Memory (RAM)), or any combination thereof for storing signals and/or data, such as instructions, program code, and/or the identification number of the mobile device 10.

Although they are not shown, the mobile device 10 may further comprise other functional units, such as a Radio Frequency (RF) unit and a Baseband unit for wireless communications, and/or an Input/Output (I/O) device (e.g., button, keyboard, mouse, or touch pad, etc.), and the invention is not limited thereto. In one embodiment, if the mobile device 10 is a mobile phone or smartphone, the Baseband unit therein may contain multiple hardware devices to perform baseband signal processing, including ADC/DAC, gain adjusting, modulation/demodulation, encoding/decoding, and so on, while the RF unit therein may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless technology, wherein the radio frequency may be 900 GHz, 1800 GHz, or 1900 GHz utilized in the Global System for Mobile communications (GSM) technology, or may be 900 GHz, 1900 GHz, or 2100 GHz utilized in the Wideband Code Division Multiple Access (WCDMA) technology, or others depending on the wireless technology in use.

Figure 2:
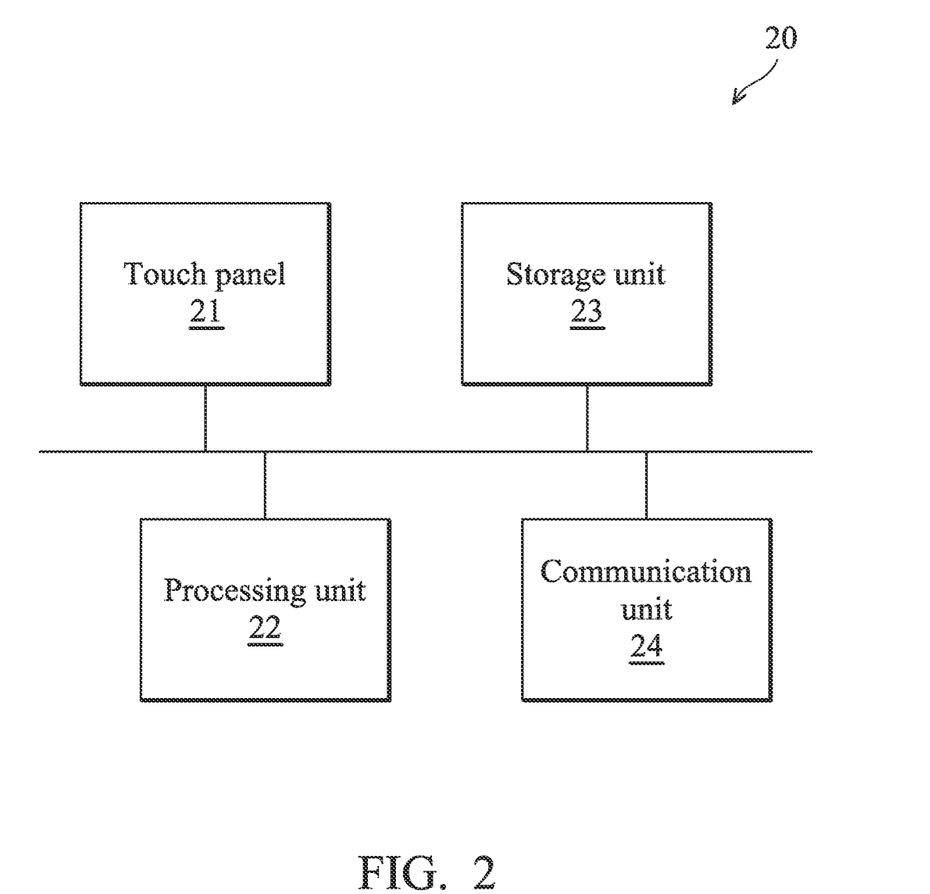
FIG. 2 is a block diagram illustrating a terminal device supporting touch-link technology according to an embodiment of the invention.

FIG. 2 is a block diagram illustrating a terminal device supporting touch-link technology according to an embodiment of the invention. The terminal device 20 comprises a touch panel 21, a processing unit 22, a storage unit 23, and a communication unit 24. The terminal device 20 may be a desktop computer, a panel PC, a notebook, a tablet, an Automatic Teller Machine (ATM), or an information kiosk.

The touch panel 21 may include one or more transmitting electrodes and receiving electrodes disposed on or under a display device or touch pad, for providing a touch-based MMI by detecting touches or proximities of conductive objects (e.g., a finger or touch pen) according to changes of the signals transmitted and received by the transmitting electrodes and receiving electrodes, respectively. In addition, with the transmitting electrodes and the receiving electrodes of the touch panel 21, the terminal device 20 can exchange information with another touch-controlled panel device (e.g., the mobile device 10) through the touch-link technology.

The processing unit 22 may include a processor and a signal processing circuit. The detailed description of the processor and the signal processing circuit is similar to the processing unit 12 in the embodiment of FIG. 1, and is not repeated here for brevity.

The storage unit 23 may be a non-volatile memory (e.g., a ROM, Flash memory, hard disc, optical disc, etc.), or may be a volatile memory (e.g., a RAM), or any combination thereof for storing signals and/or data, such as instructions, program codes, and/or the identification number of the mobile device 10.

The communication unit 24 is responsible for providing the function of wired or wireless network access, so that the terminal device 20 may connect to the Internet or a particular server set up on the Internet. The wired network access may include an Ethernet connection, an Asymmetric Digital Subscriber Line (ADSL), a cable connection, or the like. The wireless network access may include a connection to a Wireless Local Area Network (WLAN), a WCDMA system, a Code Division Multiple Access 2000 (CDMA-2000) net system work, a Time Division-Synchronous Code Division Multiple Access (TD-SCDMA) system, a Worldwide Interoperability for Microwave Access (WiMAX) system, a Long Term Evolution (LTE) system, an LTE Advanced (LTE-A) system, or a Time-Division LTE (TD-LTE) system.

Figure 3:
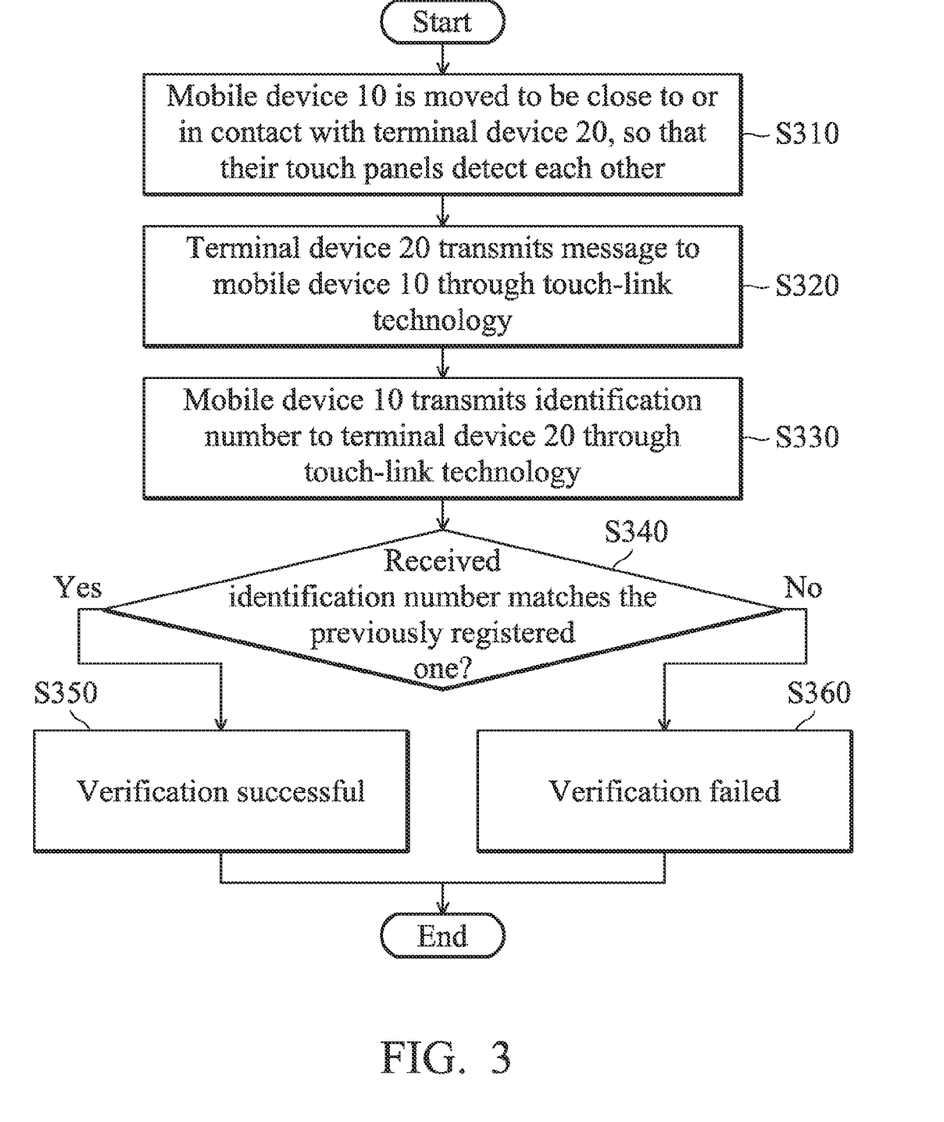
FIG. 3 is a flow chart of the verification method according to an embodiment of the invention.

FIG. 3 is a flow chart of the verification method according to an embodiment of the invention. In this embodiment, the verification method is in use between the mobile device 10 and the terminal device 20. Particularly, the mobile device 10 and the terminal device 20 both support the touch-link technology which enables exchange of information therebetween via the transmitting electrodes and the receiving electrodes of the touch panels 11 and 21. To begin, when a user wishes to perform verification on the terminal device 20, the mobile device 10 is moved to be close to or in contact with the terminal device 20, so that the two devices detect each other (step S310). That is, the touch panel 11 of the mobile device 10 may detect the contact or proximity of the terminal device 20, and the touch panel 21 of the terminal device 20 may detect the contact or proximity of the mobile device 10. For example, when the mobile device 10 and the terminal device 20 approach each other, the signals generated by the transmitting electrodes of the touch panel 11 can be received by the receiving electrodes of the touch panel 21 through electric field coupling, so that the terminal device 20 detects contact or proximity of the mobile device 10. "Detect each other" in step S310 also means that the touch panel 21 of the terminal device 20 may detect the contact or proximity of the mobile device 10, and the touch panel 11 of the mobile device 10 may detect the contact or proximity of the terminal device 20. Subsequent to step S310, the terminal device 20 transmits a message to the mobile device 10 through the touch-link technology, when detecting contact or proximity of the mobile device 10 (step S320). According to the received message, the mobile device 10 transmits its identification number to the terminal device 20 through the touch-link technology (step S330). Note that the verification method may be applied to unlock or log-in the terminal device 20, or to perform other security controls over the terminal device 20.

Figure 4:
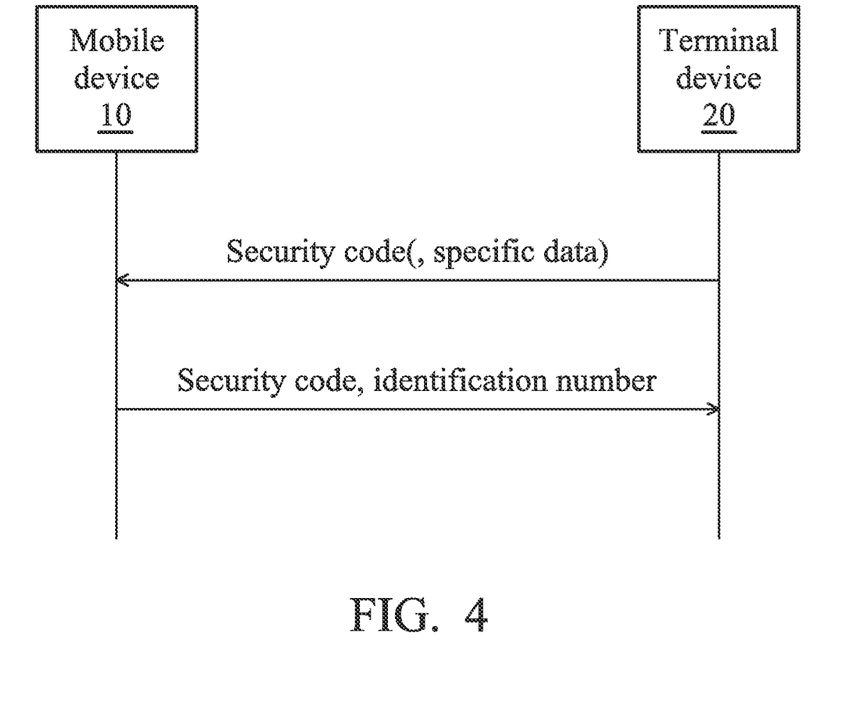
FIG. 4 is a schematic diagram illustrating the message exchange between the mobile device 10 and the terminal device 20 according to the embodiment of FIG. 3.

FIG. 4 is a schematic diagram illustrating the message exchange between the mobile device 10 and the terminal device 20 according to the embodiment of FIG. 3. Specifically, the message transmitted by the terminal device 20 includes a security code which indicates a request for the identification number of the mobile device 10. For example, when receiving the message, the mobile device 10 may parse the message to determine whether the security code matches pre-defined content, and only transmit its identification number and the security code to the terminal device 20 if the security code matches pre-defined content. In addition to the security code, the message transmitted by the terminal device 20 may further include specific data, so the mobile device 10 may have to determine whether both the security code and the specific data match pre-defined content, and only transmit its identification number and the security code to the terminal device 20 if both the security code and the specific data match pre-defined content. Subsequently, the terminal device 20 confirms whether the security code transmitted to the mobile device 10 matches the security code received from the mobile device 10, and only continues with subsequent step(s) if the two security codes match each other. The two security codes matching each other may mean that the two security codes are the same (i.e., identical), or that they correspond to the same result (e.g., by applying a mathematical operation on the two security codes). For the terminal device 20, the security code transmitted to the mobile device 10 may be referred to as the first security code, the security code received from the mobile device 10 may be referred to as the second security code, and the processing unit 22 may determine whether the first security code matches the second security code. If the first security code matches the second security code, the terminal device 20 performs step S340 in FIG. 3. In other words, the verification on the terminal device 20 is performed only if the first security code matches the second security code.

Back to FIG. 3, subsequent to step S330, the terminal device 20 determines whether the received identification number matches the identification number previously registered with the terminal device 20 by the user of the mobile device 10 (step S340). If the two identification numbers match each other, verification on the terminal device 20 is successful (step S350), and other interactions between the mobile device 10 and the terminal device 20 are allowed to happen. Otherwise, if the two identification numbers do not match each other, verification on the terminal device 20 fails (step S360). For the terminal device 20, the previously registered identification number may be referred to as the first identification number, the identification number received in step S330 may be referred to as the second identification number, and the processing unit 22 may determine whether the first identification number matches the second identification number. The two identification numbers matching each other may refer to as the two identification numbers being the same (i.e., identical), or corresponding to the same result (e.g., by applying a mathematical operation on the two identification numbers).

In one embodiment, before step S310, the user of the mobile device 10 may operate the mobile device 10 to register its identification number with the terminal device 20, and the terminal device 20 may store the identification number as the verification basis for later (i.e., the comparison of identification numbers in step S340). It should be noted that the registration of the identification number of the mobile device 10 may not be carried out by the touch-link technology. For example, the user may manually input the identification number of the mobile device 10 to the terminal device 20.

Figure 5:
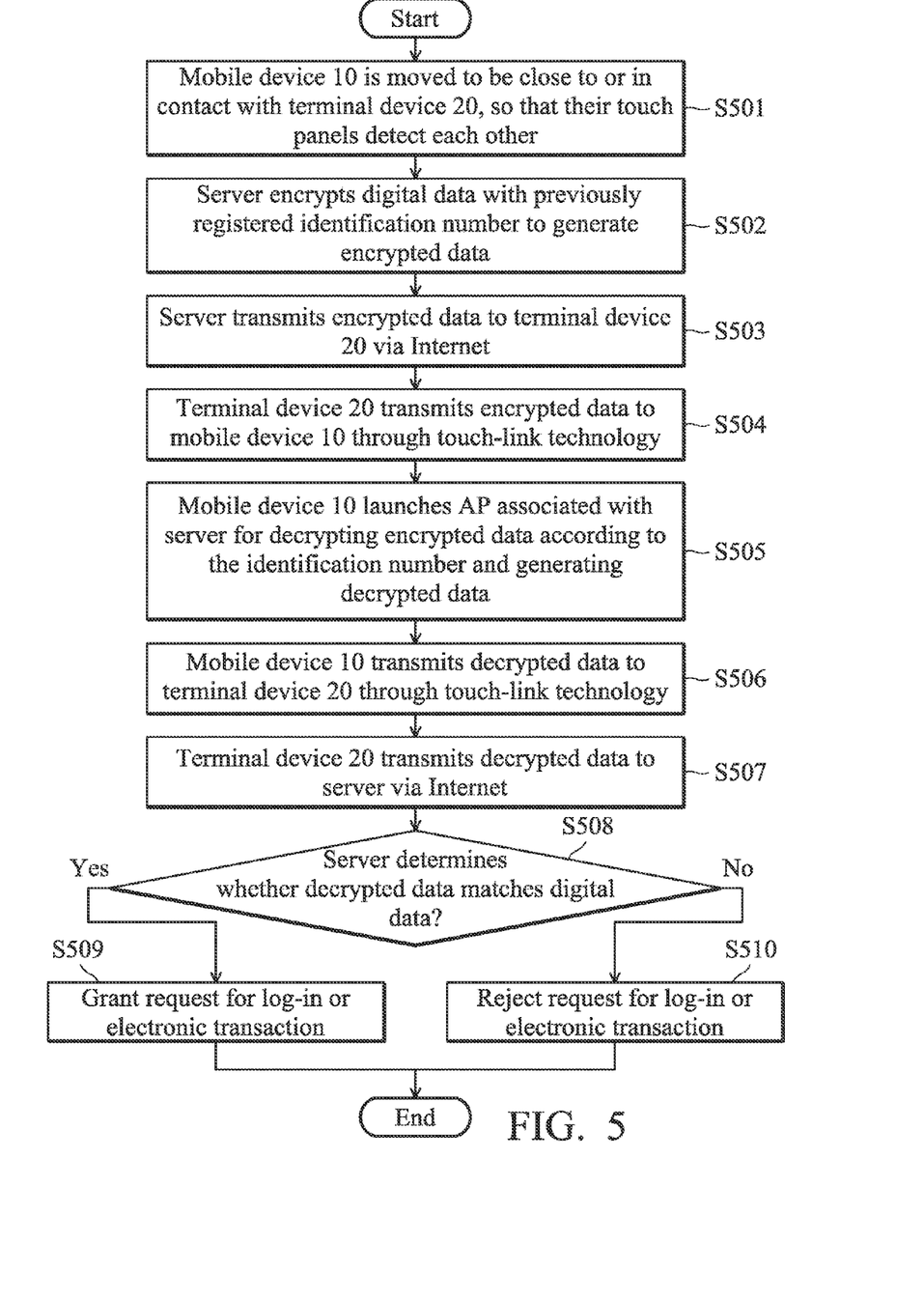
FIG. 5 is a flow chart of the verification method according to another embodiment of the invention.

FIG. 5 is a flow chart of the verification method according to another embodiment of the invention. In this embodiment, the verification method is in use between the mobile device 10, the terminal device 20, and a server. Particularly, the mobile device 10 and the terminal device 20 both support the touch-link technology which enables exchange of information therebetween via the transmitting electrodes and the receiving electrodes of the touch panels 11 and 21. The terminal device 20 is connected to the server via the Internet, and the services, such as distance education, electronic commerce, social networking, online gaming, or household registration, provided by the server can only be accessed with security control. In addition, the mobile device 10 has an identification number which can be used to uniquely identify the mobile device 10. For example, if the mobile device 10 is a mobile phone, smartphone, or panel PC, the identification number may be an IMEI. Alternatively, the identification number may be a user code, such as e-mail account, phone number, or PIN.

To begin, when a user of the mobile device 10 wishes to log-in the server or perform an electronic transaction with the server via the terminal device 20, the mobile device 10 is moved to be close to or in contact with the terminal device 20, so that the touch panels 11 and 21 detect each other (step S501). Meanwhile, the mobile device 10 encrypts its identification number using a pre-defined encryption-and-decryption method to generate identification data, and transmits the identification data to the server via the terminal device 20. In response, the server decrypts the identification data using the same pre-defined encryption-and-decryption method to identify the mobile device 10. Next, the server encrypts digital data with the identification number previously registered by the mobile device 10 to generate encrypted data (step S502), and then transmits the encrypted data to the terminal device 20 via the Internet (step S503), wherein the digital data may be a dynamically generated password, code, or sequence, or may be a pre-defined password, code, or sequence. In other words, the identification number is used as an encryption key in step S502. Subsequently, the terminal device 20 transmits the encrypted data to the mobile device 10 through the touch-link technology (step S504).

According to the encrypted data received from the terminal device 20, the mobile device 10 launches the Application Program (AP) associated with the server, which decrypts the encrypted data according to the identification number of the mobile device 10 to generate decrypted data (step S505). The mobile device 10 further transmits the decrypted data to the terminal device 20 through the touch-link technology (step S506). Similarly, the identification number is used as a decryption key in step S505.

In one embodiment, before step S501, the user of the mobile device 10 may operate the mobile device 10 to register its identification number with the server via the terminal device 20, and the server may store the identification number as the encryption key for use in step S502. It should be noted that the registration of the identification number via the terminal device 20 may not be carried out by the touch-link technology in use between the mobile device 10 and the terminal device 20. For example, the user may manually input the identification number of the mobile device 10 to the terminal device 20. In addition, during the registration of the identification number, the server may ask the mobile device 10 to install the AP mentioned in step S505. Specifically, the pre-defined encryption-and-decryption method used in steps S502 and S505 may be implemented with a certain cryptographic algorithm, such as the Data Encryption Standard (DES), Advanced Encryption Standard (AES), International Data Encryption Algorithm (IDEA), etc., or may be implemented by performing an AND/OR operation on specific bit(s) of the digital data or the encrypted data.

Subsequent to step S506, when receiving the decrypted data, the terminal device 20 transmits the decrypted data to the server via the Internet (step S507). The server determines whether the decrypted data matches the digital data mentioned in step S502 (step S508). If they match each other, the server grants the request for log-in or electronic transaction from the mobile device 10 (step S509). Otherwise, if they do not match each other, the server rejects the request for log-in or electronic transaction from the mobile device 10 (step S510).

Figure 6:
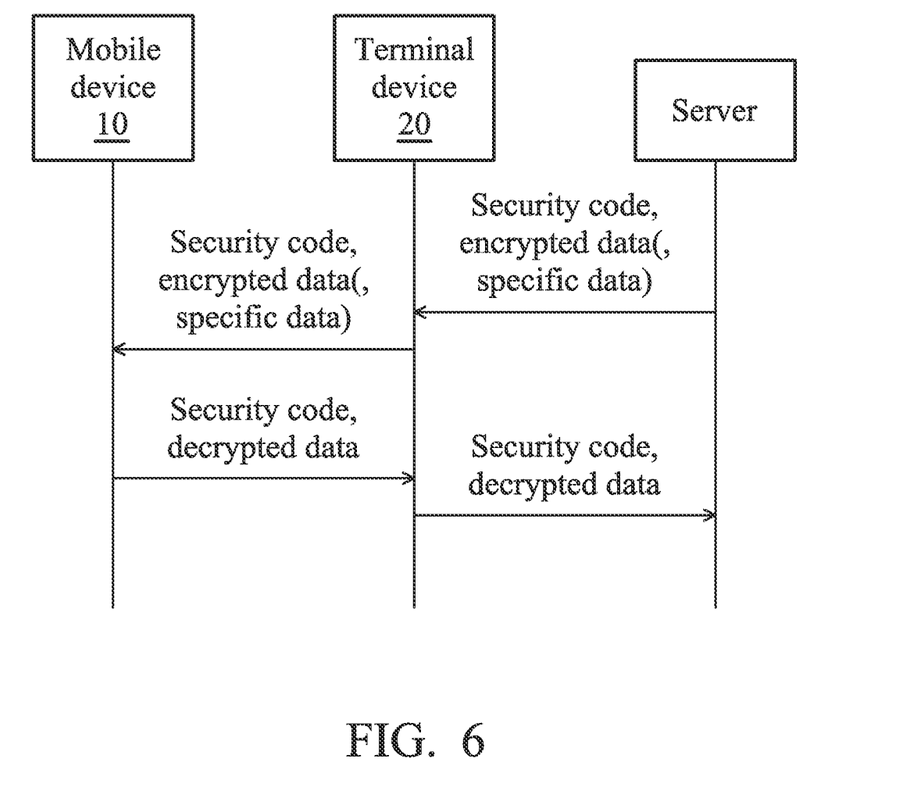
FIG. 6 is a schematic diagram illustrating the message exchange between the mobile device 10, the terminal device 20, and the server according to the embodiment of FIG. 5.

FIG. 6 is a schematic diagram illustrating the message exchange between the mobile device 10, the terminal device 20, and the server according to the embodiment of FIG. 5. Specifically, the server transmits a security code and the encrypted data to the mobile device 10 via the terminal device 20. In addition, specific data may be transmitted, along with the security code and the encrypted data, from the server to the mobile device 10 via the terminal device 20, where in the specific data may be Multipurpose Internet Mail Extensions (MIME) data. When receiving the security code and the encrypted data, or receiving the security code, the encrypted data, and the specific data, the processing unit 12 of the mobile device 10 parses the security code to determine whether the security code matches pre-defined content. If the security code matches pre-defined content, the mobile device 10 launches the AP associated with the server to perform said decryption of the encrypted data, and then transmits the decrypted data and the security code to the terminal device 20. For example, if the mobile device 10 is operative with the Android system, the intent filter of the Android system may be employed to determine the AP associated with the server according to the specific data. On the other hand, the terminal device 20 may determine whether the security code transmitted to the mobile device 10 matches the security code received from the mobile device 10, and only continues with subsequent steps if the two security codes match each other. That is, the terminal device 20 only transmits the decrypted data to the server when confirming that the two security codes match each other. For the terminal device 20, the security code transmitted to the mobile device 10 may be referred to as the first security code, the security code received from the mobile device 10 may be referred to as the second security code, and the processing unit 22 may determine whether the first security code matches the second security code. If the first security code matches the second security code, the terminal device 20 performs step S507 in FIG. 5. In other words, the terminal device 20 transmits the decrypted data to the server only if the first security code matches the second security code.

To further clarify, the encryption of the digital data mentioned in step S502 and the decryption of the encrypted data mentioned in step S505 both use the identification number of the mobile device 10 as the encryption and decryption key. However, in another embodiment, the digital data, instead of the identification number, may be used as the encryption and decryption key. For example, the steps after step S501 may be adjusted as follows. The server provides digital data P, and the digital data P is transmitted from the server to the terminal device 20 via the Internet and then transmitted from the terminal device 20 to the mobile device 10 through the touch-link technology. The mobile device 10 uses the digital data P as the encryption key to encrypt its identification number A and generate encrypted data B. After that, the server receives the encrypted data B from the mobile device 10 via the terminal device 20, and uses the digital data P as the decryption key to decrypt the encrypted data B to generate decrypted data C. Subsequently, the server determines whether the decrypted data C matches the identification number previously registered by the mobile device 10. If they match each other, the server determines that the verification is successful. Otherwise, if they do not match each other, the server determines that the verification is failed. That is, in the invention, it is not only the identification number of the mobile device 10, but also the digital data that may be used as the encryption and decryption key. In other words, the encryption and decryption key is not limited only to the identification number of the mobile device 10. Moreover, the encryption process may be performed in the server or the mobile device 10 as well. The security code may be configured in the header of the transmitted message, which indicates to the receiver the type of data (e.g., encrypted data or not) carried in the payload of the message.

It should be understood that the verification process described in FIGS. 5 and 6 may be repeated for each log-in, or multiple electronic transactions, or multiple verifications required during a single electronic transaction.

While the invention has been described by way of example and in terms of preferred embodiment, it is to be understood that the invention is not limited thereto. Those who are skilled in this technology can still make various alterations and modifications without departing from the scope and spirit of this invention.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile device, having a hardware identify number, comprising:
a touch panel, comprising at least one transmitting electrode and at least one receiving electrode, wherein the transmitting electrode performs signal transmission using a touch-link technology, and the receiving electrode performs signal reception using the touch-link technology; and
a processing unit, configured to receive encrypted data and a security code of a server from a terminal device via the receiving electrode, parse the security code to determine whether the security code matches a predefined content, launch an application program associated with the server to decrypt the encrypted data according to the hardware identification number and generate decrypted data when the security code matches the predefined content, and transmit the decrypted data with the security code to the terminal device via the transmitting electrode, thereby enabling the terminal device to transmit the decrypted data to the server to assist the mobile device with obtaining a log-in access or transaction authorization of the server.

2. The mobile device of claim 1, wherein the processing unit further transmits the hardware identification number to the terminal device via the transmitting electrode, thereby enabling the terminal device to transmit the hardware identification number to the server for registering the mobile device with the server, and the encrypted data is generated by the server using the hardware identification number as an encryption key.

3. The mobile device of claim 1, wherein the encrypted data is received with Multipurpose Internet Mail Extensions (MIME) data of the server from the terminal device, and the processing unit further determines whether to launch the application program according to the MIME data.

4. A terminal device, comprising:
a communication unit, configured to provide a connection to a server via the Internet;
a touch panel, comprising at least one transmitting electrode and at least one receiving electrode, wherein the transmitting electrode performs signal transmission using a touch-link technology, and the receiving electrode performs signal reception using the touch-link technology; and
a processing unit, configured to receive encrypted data from the server via the communication unit, transmit the encrypted data and a first security code of the server to a mobile device via the transmitting electrode, receive decrypted data and a second security code from the mobile device via the receiving electrode, wherein the decrypted data is derived from the encrypted data, determine whether the first security code is identical with the second security code, transmit the decrypted data to the server via the communication unit when the first security code is identical with the second security code, so as to assist the mobile device with obtaining a log-in access or transaction authorization of the server.

5. The terminal device of claim 4, wherein the processing unit further receives a hardware identification number of the mobile device via the receiving electrode, prior to receiving the encrypted data, and registers the hardware identification number with the server via the communication unit.

6. The terminal device of claim 5, wherein the encrypted data is generated by encrypting digital data with the hardware identification number, and the terminal device obtains the log-in access or transaction authorization when the decrypted data is identical with the digital data.

7. The terminal device of claim 4, wherein the encrypted data is transmitted with Multipurpose Internet Mail Extensions (MIME) data of the server to the mobile device.

* * * * *